(12) United States Patent
Osugi (10) Patent No.: US 10,862,419 B2
(45) Date of Patent: Dec. 8, 2020

(54) MOTOR DRIVE SYSTEM, AND METHOD OF CONTROLLING MOTOR DRIVE SYSTEM

(71) Applicant: TOYOTA JIDOSHA KABUSHIKI KAISHA, Toyota (JP)

(72) Inventor: Ryosuke Osugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/411,847

(22) Filed: May 14, 2019

(65) Prior Publication Data

US 2019/0393824 A1    Dec. 26, 2019

(30) Foreign Application Priority Data

Jun. 26, 2018  (JP) ................. 2018-121294

(51) Int. Cl.
| | |
|---|---|
| *H02P 27/08* | (2006.01) |
| *H02P 21/22* | (2016.01) |
| *H02P 21/00* | (2016.01) |
| *B60L 15/20* | (2006.01) |
| *H02M 7/5387* | (2007.01) |
| *B60K 6/22* | (2007.10) |

(52) U.S. Cl.
CPC ............ *H02P 27/085* (2013.01); *B60L 15/20* (2013.01); *H02M 7/53871* (2013.01); *H02P 21/0003* (2013.01); *H02P 21/22* (2016.02); *B60K 6/22* (2013.01); *B60L 2210/40* (2013.01); *B60Y 2200/91* (2013.01); *B60Y 2200/92* (2013.01); *B60Y 2400/61* (2013.01)

(58) Field of Classification Search
None
See application file for complete search history.

(56) References Cited

U.S. PATENT DOCUMENTS

| | | | | |
|---|---|---|---|---|
| 9,252,699 | B2 * | 2/2016 | Ota | ........................ H02P 27/08 |
| 9,290,106 | B2 * | 3/2016 | Sato | ...................... H02P 27/085 |
| 2007/0114965 | A1 | 5/2007 | Kutsuna et al. | |
| 2015/0321573 | A1 | 11/2015 | Sato | |
| 2018/0367076 | A1 * | 12/2018 | Nakano | ............... H02P 21/0025 |

FOREIGN PATENT DOCUMENTS

| | | |
|---|---|---|
| JP | H09-070195 A | 3/1997 |
| JP | 2000-134990 A | 5/2000 |
| JP | 2015-214188 A | 12/2015 |

* cited by examiner

*Primary Examiner* — Bickey Dhakal
(74) *Attorney, Agent, or Firm* — Oliff PLC (57) ABSTRACT

A motor drive system includes a motor for driving a vehicle, an inverter, and an electronic control unit. The electronic control unit is configured to change a carrier frequency as a frequency of a carrier wave, according to operating conditions of the motor. The electronic control unit is configured to set the carrier frequency to a protection frequency when the operating point of the motor lies in a lock region, and the motor is not in an accelerating or decelerating state, and set the carrier frequency to a non-protection frequency higher than the protection frequency, when the operating point lies in the lock region, and the motor is in the accelerating or decelerating state.

3 Claims, 5 Drawing Sheets

MOTOR DRIVE SYSTEM, AND METHOD OF CONTROLLING MOTOR DRIVE SYSTEM

INCORPORATION BY REFERENCE

The disclosure of Japanese Patent Application No. 2018-121294 filed on Jun. 26, 2018 including the specification, drawings and abstract is incorporated herein by reference in its entirety.

BACKGROUND

1. Technical Field

This specification relates to a motor drive system that drives a motor as one of power sources of a vehicle, and a method of controlling the motor drive system.

2. Description of Related Art

In an electrically powered vehicle, such as an electric vehicle or a hybrid vehicle, a motor is installed as one of its power sources. The motor is driven by a motor drive system including an inverter and a control unit. The inverter switches a plurality of switching devices between ON and OFF, so as to convert direct-current (DC) power into alternating-current (AC) power, and deliver the AC power to the motor. The control unit produces a switching signal of the inverter, by comparing a modulating wave indicating a command value for the motor, with a carrier wave.

When rotation of the motor is disturbed or hampered by external force, and the motor is brought into a locked state, electric current concentrates in a winding of only one phase, among windings provided in the motor. In this case, switching devices corresponding to this phase, among the switching devices provided in the inverter, rapidly generate heat. Thus, it has been proposed to determine that the motor is in the locked state when its rotational speed becomes equal to or lower than a predetermined speed, and change the frequency of the carrier wave (which will be called "carrier frequency") to a particularly low protection frequency.

However, the rotational speed of the motor is reduced not only in the case where the motor is locked, but becomes temporarily equal to or lower than the predetermined speed in the course of acceleration or deceleration. If the carrier frequency is changed to the protection frequency when the motor speed temporarily passes a low-speed region as in this case, a noise problem may be created.

Thus, a technology for protecting switching devices while preventing the noise is described in Japanese Unexamined Patent Application Publication No. 2000-134990 (JP 2000-134990 A). More specifically, in a control system of JP 2000-134990 A, a temperature sensor is provided for detecting the temperature (device temperature) of the switching devices, and a determination line that indicates criteria for determination as to which combination of the device temperature and a torque command value requires the carrier frequency to be changed to the protection frequency is obtained in advance. Then, when the motor speed becomes equal to or lower than a predetermined threshold value, the device temperature and torque command value at this point in time are compared with the determination line, and the carrier frequency is changed to the protection frequency if the device temperature and the torque command value become greater than the determination line.

With the control system of JP 2000-134990 A, even when the rotational speed of the motor becomes equal to or lower than the predetermined threshold value, the carrier frequency is not changed to the protection frequency unless the device temperature and the torque command value become greater than the determine line. As a result, the carrier frequency is not changed to the protection frequency when the motor passes a low-speed region only temporarily; therefore, unnecessary noise can be effectively prevented from being generated.

SUMMARY

However, when the system is configured to change the carrier frequency in view of the device temperature, as in JP 2000-134990, it is naturally necessary to provide a temperature sensor separately. The addition of the temperature sensor results in increase of the cost, and increase of the number of steps for maintenance of components.

Thus, the present disclosure provides a motor drive system that achieves both prevention of overheating of switching devices, and prevention of unnecessary noise, without requiring a temperature sensor to be added, and a method of controlling the motor drive system.

A first aspect of the disclosure is concerned with a motor drive system. The motor drive system includes a motor for driving a vehicle, an inverter, and an electronic control unit. The inverter includes a plurality of switching devices, and is configured to convert direct-current power into alternating-current power. The electronic control unit is configured to generate a switching signal of each of the switching devices, by performing, based on a carrier wave, pulse-width modulation of a modulating wave indicating a command value for the motor. The electronic control unit is configured to change a carrier frequency as a frequency of the carrier wave, according to operating conditions of the motor. The electronic control unit is configured to set the carrier frequency to a protection frequency for protecting the switching devices, when the motor is in a first state in which an operating point determined by a rotational speed of the motor and torque of the motor lies in a lock region that is defined in advance, and the motor is not in an accelerating or decelerating state The electronic control unit is configured to set the carrier frequency to a non-protection frequency that is higher than the protection frequency, when the motor is in a second state in which the operating point lies in the lock region, and the motor is in the accelerating or decelerating state.

With the above configuration, when the motor is in an accelerating or decelerating state, the carrier frequency is set to the non-protection frequency even when the motor operating point lies in the lock region. It is thus possible to prevent a noise problem that would arise when the motor operating point temporarily enters the lock region in the course of acceleration or deceleration, and the carrier frequency is changed to the protection frequency. Also, with the above configuration, no temperature sensor is needed, and the number of components can be prevented from being increased.

In the motor drive system, the electronic control unit may be configured to store a map for locked state and a map for non-locked state, as maps indicating correlations between the operating point and the carrier frequency. The map for locked state may be a map in which the carrier frequency in the lock region is set to the protection frequency. The map for non-locked state may be a map in which the carrier frequency is set to a frequency that is higher than the protection frequency, over an entire range. The electronic control unit may be configured to select a reference map to be referred to, from the map for locked state and the map for non-locked state, based on the rotational speed of the motor and an acceleration of the motor, and determine the carrier frequency based on the reference map.

With the above configuration, the two maps are selectively used according to the motor rotational speed and acceleration. Thus, the process of determining the carrier frequency can be simplified.

In the motor drive system, a hysteresis region in which a current frequency is used as the carrier frequency may be set around the lock region, in the map for locked state. The electronic control unit may be configured to determine that the motor is in the accelerating or decelerating state, when an absolute value of the acceleration of the motor is larger than a threshold value that is larger than zero.

With the above configuration, the threshold value used for determining the accelerating or decelerating state is set to a value larger than zero, so that the possibility of erroneously determining the locked state as the non-locked state can be reduced. Also, when the threshold value is larger than zero, the operating point of the motor moves little by little even when the motor is in the locked state. In this case, if the hysteresis region is provided around the lock region in the map for locked state, the frequency of change of the carrier frequency can be reduced.

A second aspect of the disclosure is concerned with a method of controlling a motor drive system. The motor drive system includes a motor for driving a vehicle, an inverter, and an electronic control unit. The inverter includes a plurality of switching devices, and is configured to convert direct-current power into alternating-current power. The method includes: generating, by the electronic control unit, a switching signal of each of the switching devices, by performing, based on a carrier wave, pulse-width modulation of a modulating wave indicating a command value for the motor; changing, by the electronic control unit, a carrier frequency as a frequency of the carrier wave according to operating conditions of the motor; setting, by the electronic control unit, the carrier frequency to a protection frequency for protecting the switching devices when the motor is in a first state in which an operating point determined by a rotational speed of the motor and torque of the motor lies in a lock region that is defined in advance, and the motor is not in an accelerating or decelerating state; and setting, by the electronic control unit, the carrier frequency to a non-protection frequency that is higher than the protection frequency when the motor is in a second state in which the operating point lies in the lock region, and the motor is in the accelerating or decelerating state.

With the above configuration, when the motor is in an accelerating or decelerating state, the carrier frequency is set to the non-protection frequency even when the motor operating point lies in the lock region. It is thus possible to prevent a noise problem that would arise when the motor operating point temporarily enters the lock region in the course of acceleration or deceleration, and the carrier frequency is changed to the protection frequency. Also, with the above configuration, no temperature sensor is needed, and the number of components can be prevented from being increased.

With the motor drive system described in this specification, even when the motor operating point is in the lock region, the carrier frequency is set to the non-protection frequency when the motor is in an accelerating or decelerating state. Thus, noise is prevented from being temporarily generated in the course of acceleration or deceleration. Also, the above configuration does not require a temperature sensor, and therefore, the number of components can be prevented from being increased. As a result, it is possible to achieve both prevention of overheating of the switching devices and prevention of unnecessary noise, without requiring a temperature sensor to be added.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
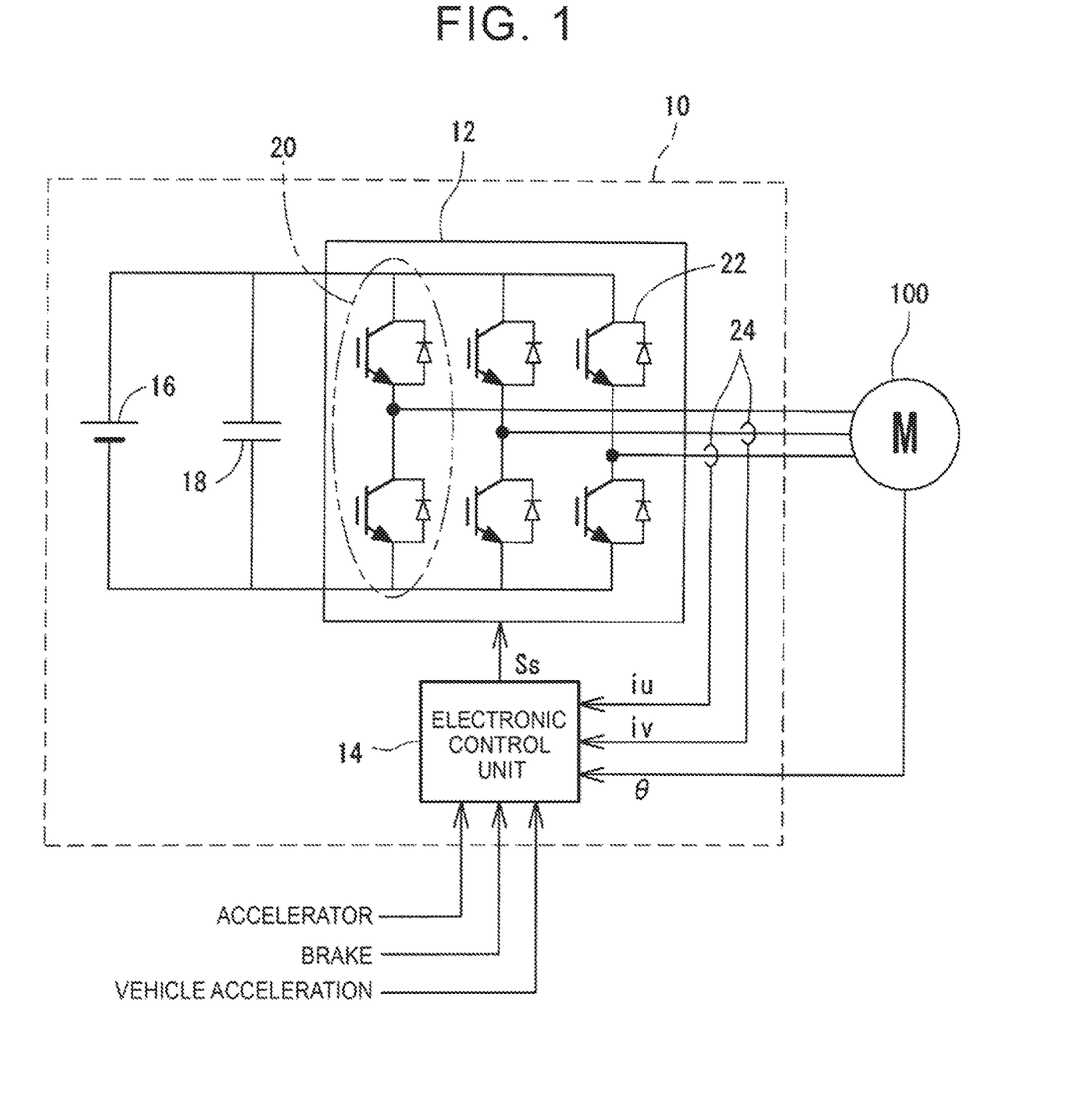
FIG. 1 is a view showing the configuration of a motor drive system.

The configuration of a motor drive system 10 will be described with reference to the drawings. FIG. 1 shows the configuration of the motor drive system 10. The motor drive system 10 drives a motor 100 as one of power sources of an electrically powered vehicle (such as a hybrid vehicle, or an electric vehicle), under pulse-width modulation (PWM) control. The motor 100, which generates traveling power, is installed on the vehicle. The motor 100 is a three-phase motor, and has three-phase coils. The motor 100 may also function as a generator that generates electric power by using excess power of an engine (not shown) or braking force of the vehicle.

Current sensors 24 are mounted to coils of two phases (U phase and V phase in the illustrated example), as a part of the three-phase coils, and serve to detect electric current flowing through the coils. Current detection values iu, iv obtained by the current sensors 24 are transmitted to an electronic control unit 14. The motor 100 is also provided with a position sensor (such as a resolver, not shown) that detects the position of a rotor of the motor 100, and the position (rotational angle θ) detected by the position sensor is transmitted to the electronic control unit 14.

An inverter 12 that converts direct-current (DC) power into alternating-current (AC) power is connected to one end of each of the three-phase coils. Also, a smoothing capacitor 18 and a power supply 16 are connected in parallel to the inverter 12. Here, the power supply 16 may be a secondary battery capable of charge and discharge, or may be a power storing means, such as a capacitor.

The inverter 12 consists of three (three-phase) arms 20 connected in parallel. Two switching devices 22 are connected in series to each of the arms 20. Each of the switching devices 22 has a transistor, such as an insulated gate bipolar transistor (IGBT), and a flyback diode connected in parallel to the transistor. In operation, the upper transistor is turned on, so that current flows into a corresponding one of the coils, and the lower transistor is turned on, so that current flows out of the corresponding coil.

The electronic control unit 14 controls driving of the inverter 12. The electronic control unit 14 receives the current detection values iu, iv and the rotational angle θ, as described above. The electronic control unit 14 also receives the amounts of operation of an accelerator pedal and a brake pedal of the vehicle, vehicle acceleration, and so forth, from a higher-level control unit. The vehicle acceleration is detected by an acceleration sensor provided in the vehicle. The electronic control unit 14 produces a switching signal of the inverter 12, based on these items of information, and switches the switching devices 22 between ON and OFF.

Figure 2:
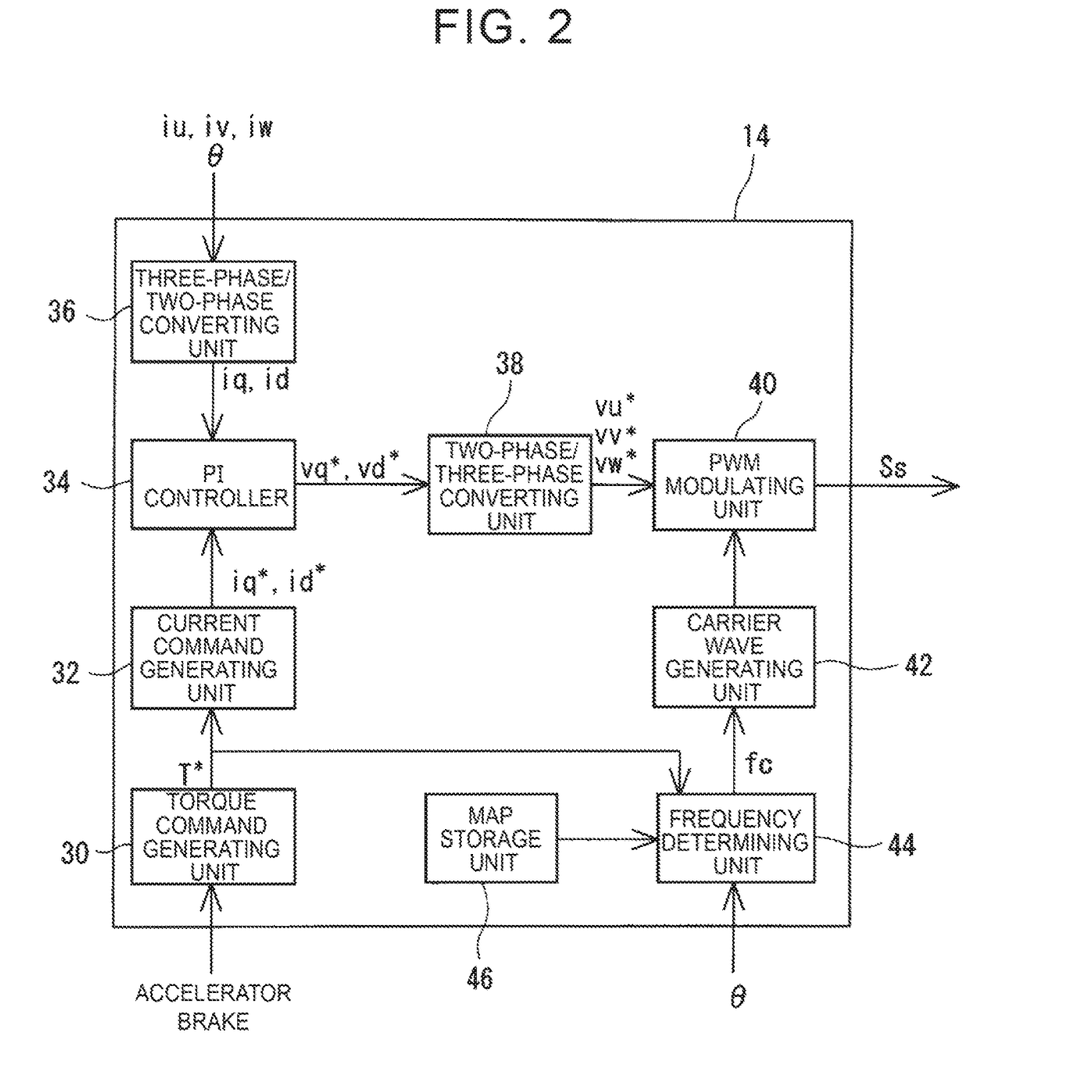
FIG. 2 is a functional block diagram of an electronic control unit.

The electronic control unit 14, which is a microcomputer, for example, physically has a central processing unit (CPU) that performs various computations, and a memory that stores various kinds of information and programs. FIG. 2 is a functional block diagram of the electronic control unit 14.

A torque command generating unit 30 calculates a torque command T*, namely, required power (target output torque) of the motor 100, based on information, such as the operation amounts of the accelerator pedal and brake pedal, received from a higher-level control unit. The torque command T* thus calculated is supplied to a current command generating unit 32 and a frequency determining unit 44. The current command generating unit 32 calculates a d-axis current command id* and a q-axis current command iq*, based on the torque command T*. The d-axis current command id* and q-axis current command iq* thus calculated are supplied to a PI controller 34.

In the meantime, the rotor rotational angle θ of the motor 100 and the current detection values iu, iv currently obtained are supplied to a three-phase/two-phase converting unit 36. The three-phase/two-phase converting unit 36 calculates a current detection value iw of the W phase, from the current detection values iu, iv, and converts the three-phase current detection values iu, iv, iw, into a d-axis current detection value id and a q-axis current detection value iq. The d-axis current detection value id and q-axis current detection value iq thus obtained are also supplied to the PI controller 34.

The PI controller 34 calculates a d-axis voltage command vd* and a q-axis voltage command vq*, based on the d-axis and q-axis current commands id*, iq* and the d-axis and q-axis current detection values id, iq. The PI controller 34 calculates the voltage commands vd*, vq*, through feedback control, such as P (proportional) control, and I (integral) control. It is, however, to be noted that this calculation method is merely an example, and the d-axis and q-axis voltage commands vd*, vq* may be calculated through other control, such as P control, or PID (proportional-integral-derivative) control. Also, feedforward control, such as prediction control, may be combined with the feedback control.

The d-axis and q-axis voltage commands vd*, vq* thus calculated are supplied to a two-phase/three-phase converting unit 38. The two-phase/three-phase converting unit 38 converts the d-axis and q-axis voltage commands vd*, vq* into three-phase voltage commands vu", vv", vw". The three-phase voltage commands vu*, vv*, vw* are supplied to a PWM modulating unit 40.

The PWM modulating unit 40 generates switching signals Ss of the switching devices 22 in the inverter 12, by comparing modulating waves indicating the voltage commands vu*, vv*, vw* with a carrier wave. The carrier wave is, for example, a triangular wave, and is generated by a carrier wave generating unit 42. The inverter 12 is switched based on the switching signals Ss, so that desired current flows into the motor 100.

The frequency of the carrier wave (which will be called "carrier frequency fc") is determined by the frequency determining unit 44. Also, two types of maps, namely, a map 50 for non-locked state and a map 52 for locked state are stored in a map storage unit 46. The frequency determining unit 44 determines the carrier frequency fc, referring to these maps 50, 52.

Figure 3:
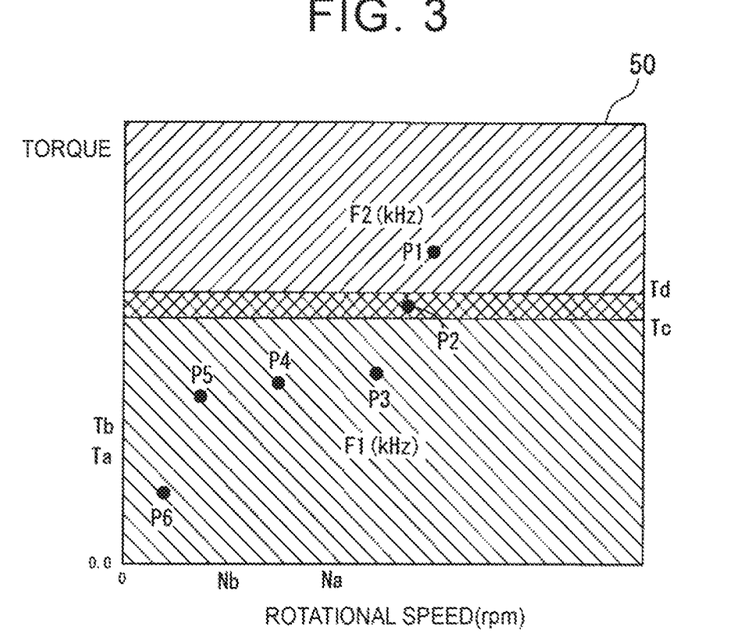
FIG. 3 is a view showing one example of a map for non-locked state.
Figure 4:
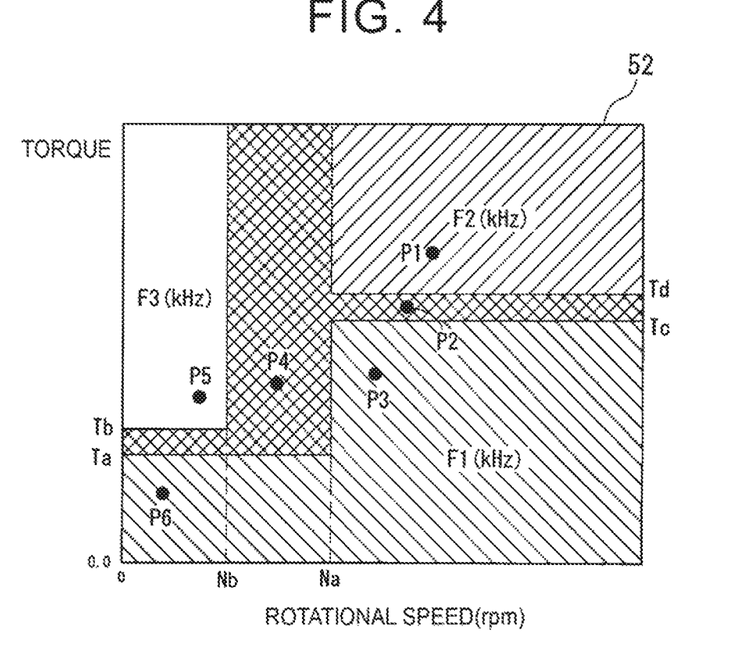
FIG. 4 is a view showing one example of a map for locked state.

The manner of determining the carrier frequency fc will be described. FIG. 3 shows one example of the map 50 for non-locked state, and FIG. 4 shows one example of the map 52 for locked state. In FIG. 3 and FIG. 4, the horizontal axis indicates the rotational speed Nm of the motor 100, and the vertical axis indicates the torque T of the motor 100.

Both the map 52 for locked state and the map 50 for non-locked state show correlations between operating points defined by the rotational speed Nm of the motor and the torque T, and the carrier frequency fc. As is apparent from FIG. 3 and FIG. 4, in this example, there are three different frequencies F1, F2, F3 (F1>F2>F3) as candidates of the carrier frequency fc. The frequency F3 is a frequency determined in view of prevention of overheating of the switching devices 22, and is significantly lower than the two frequencies F1, F2. In the following description, the frequency F3 will be called "protection frequency F3". The protection frequency F3 is, for example, 1.5 kHz or lower. The frequencies F1, F2 are higher than the protection frequency F3, and are determined in view of noise prevention. In the following description, each of the frequencies F1, F2 will be simply called "non-protection frequency" when they are not distinguished from each other. The non-protection frequency is, for example, 2 kHz or higher.

In the map 50 for non-locked state, the carrier frequency fc is set to a non-protection frequency (F1 or F2) over the entire range. In the map 50 for non-locked state, the carrier frequency fc is set to be lower as the motor torque T is larger. More specifically, in the example of FIG. 3, a region in which the motor torque T is equal to or smaller than a specified value Tc is a high-frequency region, irrespective of the motor speed Nm. When the operating point of the motor lies in this high-frequency region, the carrier frequency fc is set to F1 as a relatively high frequency. A region in which the motor torque Tm is equal to or larger than a specified value Td (Td>Tc) is a low-frequency region, irrespective of the motor speed Nm. When the operating point of the motor lies in the low-frequency region, the carrier frequency fc is set to F2 as a frequency lower than F1.

A region in which the motor torque T is larger than the specified value Tc and is smaller than the specified value Td is a hysteresis region. When the operating point of the motor lies in the hysteresis region, the carrier frequency fc is kept at the current carrier frequency fc. For example, in FIG. 3, when the operating point of the motor 100 moves from point P1 in the low-frequency region to point P2 in the hysteresis region, the carrier frequency fc remains to be the frequency F2. Also, when the operating point of the motor moves from point P3 in the high-frequency region to point P2 in the hysteresis region, the carrier frequency fc remains to be the frequency F1.

The map 52 for locked state is a map that is referred to when the motor 100 is highly likely to be in a locked state in which rotation of the motor 100 is disturbed or hampered by external force. In the map 52 for locked state, the carrier frequency fc in a lock region is set to the protection frequency F3. More specifically, in the example of FIG. 4, a region in which the motor speed Nm is equal to or lower than a specified value Nb, and the motor torque T is equal to or larger than Tb provides the lock region. When the motor operating point lies in the lock region, the carrier frequency fc is set to the sufficiently low protection frequency F3.

A hysteresis region is set around the lock region. More specifically, the hysteresis region is a part of a region in which the motor torque T is equal to or larger than Ta, and the motor speed Nm is equal to or lower than Na, and excludes the lock region. When the operating point of the motor 100 is in the hysteresis region, the carrier frequency fc is kept at the current frequency fc.

Here, the reason why the lock region is provided will be described. The motor 100 is in the locked state, when rotation of the motor 100 is disturbed or hampered by external force, and the motor 100 stops rotating, or is rotating at an extremely low speed. When the motor 100 is placed in the locked state, electric current concentrates in only one-phase winding, out of the windings provided in the motor 100. In this case, the switching devices 22 corresponding to the one phase, among the switching devices 22 provided in the inverter 12, rapidly generate heat, and may be damaged or deteriorated in some cases.

In order to prevent overheating of the switching devices 22, it has been proposed to set the carrier frequency fc to a significantly low protection frequency F3 when the operating point of the motor 100 is in the lock region. In this manner, the switching frequency is reduced, and a loss of the switching devices 22 is reduced. As a result, heat generated by the switching devices 22 is reduced. In this example, however, even when the motor 100 is locked, and stops rotating or rotates at a low speed (Nm<Nb), the carrier frequency fc is set to the relatively high frequency F1 when the torque T is smaller than Tb. This is because, even when the motor 100 is locked, the amount of current passing through the motor 100, or the amount of heat generated, is small, and the possibility of overheating is small, when the motor torque T is small.

The frequency determining unit 44 selects one of the map 52 for locked state and the map 50 for non-locked state, based on the current operating conditions of the motor 100, and determines the carrier frequency fc, by checking the current operating point of the motor 100 against the selected map. The motor speed Nm may be calculated from the rotor rotational angle θ, or may be calculated from the vehicle speed. More specifically, the motor angular velocity may be calculated by differentiating the rotor rotational angle θ, and the motor angular velocity may be converted into the rotational speed Nm. Alternatively, the motor speed Nm may be calculated from the vehicle speed, since the motor speed and the vehicle speed are in a proportional relationship with each other. Also, in this example, the torque command value T* generated by the torque command generating unit 30 is regarded as the motor torque T. However, the motor torque may be calculated from the current detection values, in place of the torque command value T*, or the motor 100 may be provided with a torque sensor.

In the related art, the carrier frequency fc is set, referring only to the map 52 for locked state, without switching between the map 50 for non-locked state and the map 52 for locked state. Thus, when the motor operating point is located in the lock region, the carrier frequency fc is always set to the protection frequency F3. Accordingly, when the motor operating point passes the lock region only temporarily, in the course of acceleration or deceleration of the motor 100, the carrier frequency fc is also switched to the protection frequency F3 only temporarily.

However, in this case, there is a problem that unnecessary noise is generated. Namely, the non-protection frequencies F1, F2 established when the motor 100 is not locked are normally set to high frequencies (e.g., equal to or higher than 2 kHz) at which electromagnetic resonance of the motor 100 does not fall within an audible area. On the other hand, the protection frequency F3 is set to a sufficiently low value (e.g., 1.5 kHz or lower), with more emphasis placed on reduction of heat generated by the switching devices 22, rather than reduction of noise, and the electromagnetic resonance of the motor 100 may fall within the audible area at the protection frequency F3.

Therefore, if the carrier frequency fc is switched to the protection frequency F3 only temporarily, during acceleration or deceleration of the motor 100, as described above, noise caused by the electromagnetic resonance of the motor 100, etc., is increased temporarily, and an occupant of the vehicle may feel strange or uncomfortable, even though there is no particular problem in the motor 100.

Thus, it has been proposed, as a part of the related art, to measure the temperature (device temperature) of each switching device 22 with a temperature sensor, and determine whether the carrier frequency fc is to be switched to the protection frequency F3, in view of the device temperature. According to this technology, when the operating point of the motor 100 passes the lock region only temporarily, the carrier frequency fc is not switched to the protection frequency F3. As a result, unnecessary noise is prevented from being generated. However, this technology makes it necessary to provide the temperature sensor for detecting the temperature of each switching device 22, resulting in increase of the number of components. The increase of the number of components incurs increase of the component cost, and increase of the number of process steps for maintenance.

Thus, in this embodiment, when the motor is in an accelerating or decelerating state, it is determined that the motor is not locked even when the operating point of the motor 100 lies in the lock region, and the carrier frequency fc is set to the frequency F1 or F2 that is higher than the protection frequency F3. More specifically, in this embodiment, the map 52 for locked state, in which the lock region is provided, and the map 50 for non-locked state, in which the lock region is not provided, are prepared, and the map to be referred to is selected according to the rotational speed Nm and acceleration Am of the motor. Here, the motor speed Nm and the acceleration Am may be obtained by differentiating the rotor rotational angle θ or differentiating it twice. The vehicle is normally provided with a vehicle speed sensor that detects the vehicle speed, and an acceleration sensor that detects the acceleration of the vehicle. Accordingly, the motor speed Nm and acceleration Am may be calculated from detection values of the vehicle speed sensor and acceleration sensor.

Figure 5:
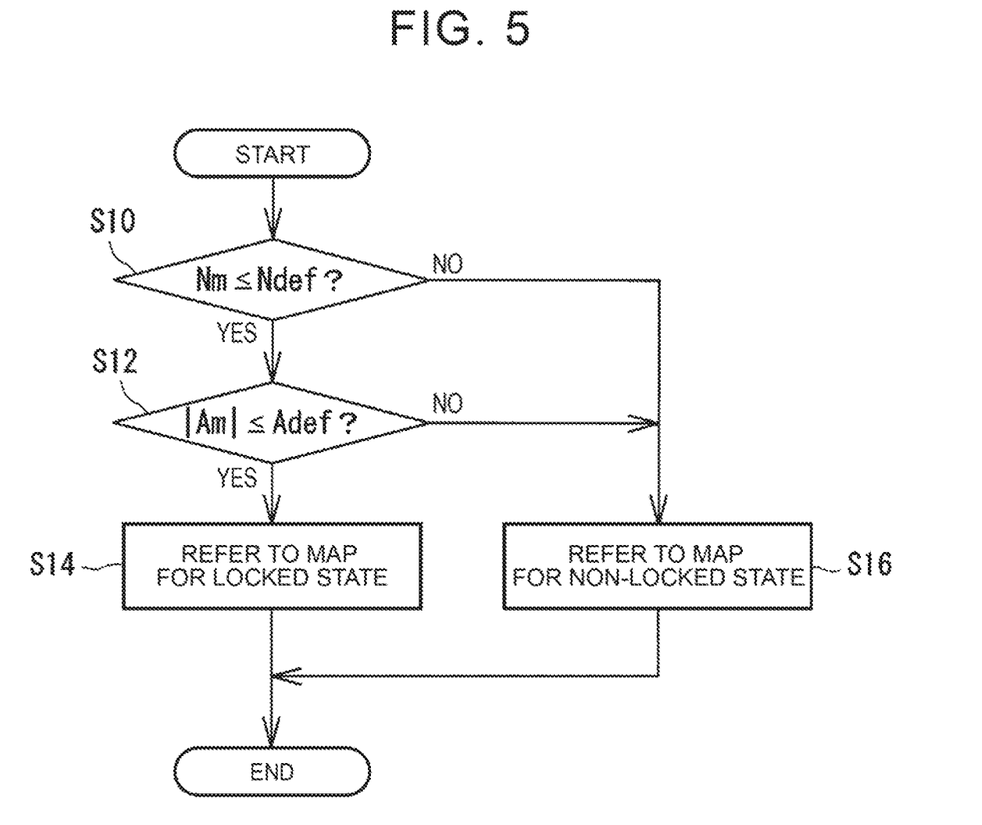
FIG. 5 is a flowchart illustrating the flow of a map selection process.

FIG. 5 is a flowchart illustrating the flow of a process of selecting a map by the frequency determining unit 44. As shown in FIG. 5, the frequency determining unit 44 initially determines whether the motor rotational speed Nm is equal to or lower than a specified threshold value Ndef (S10). The threshold value Ndef is not particularly limited provided that it is equal to or higher than the maximum rotational speed Na of the hysteresis region set around the lock region; however, the threshold value Ndef is desirably set to Na, for simplicity of the process.

When the motor speed Nm is higher than the threshold value Ndef, there is no possibility that the motor 100 is in the locked state; therefore, the frequency determining unit 44 determines the carrier frequency fc, referring to the map 50 for non-locked state (S16). On the other hand, when the motor speed Nm is equal to or lower than the threshold value Ndef, the frequency determining unit 44 subsequently determines whether the motor is in an accelerating or decelerating state (S12). More specifically, the frequency determining unit 44 determines whether the absolute value of the motor acceleration Am is larger than a specified threshold value Adef. The threshold value Adef is not particularly limited provided that it is equal to or larger than zero; however, it is desirable to set the threshold value Adef to a value of a certain magnitude, which is larger than zero, so as to prevent the locked state from being erroneously determined as the non-locked state.

When the motor acceleration Am is larger than the threshold value Adef, the frequency determining unit 44 can determine that the motor 100 is not in the locked state, and thus determines the carrier frequency fc, referring to the map 50 for non-locked state (S16). Accordingly, in this case, even if the motor operating point is located in the lock region, the carrier frequency fc is set to the frequency F1, F2 other than the protection frequency.

When the motor acceleration Am is equal to or smaller than the threshold value Adef, the motor 100 may be in the locked state; therefore, the frequency determining unit 44 sets the carrier frequency fc, referring to the map 52 for locked state (S14). Accordingly, in this case, if the motor operating point is located in the lock region, the protection frequency F3 is set as the carrier frequency fc.

Here, some case examples will be studied. First, the case where the operating point of the motor 100 moves from point P6 to points P5, P4, P3, at an acceleration equal to or larger than the threshold value Adef, will be considered. In this case, since the motor acceleration Am exceeds the threshold value Adef, the frequency determining unit 44 determines that the carrier frequency fc is equal to F1, referring to the map 50 for non-locked state.

Also, suppose the operating point of the motor 100 moves from point P5 to point P4, at an acceleration equal to or smaller than the threshold value Adef, after moving from point P6 to point P5 at an acceleration exceeding the threshold value Adef. In this case, during a period in which the operating point of the motor 100 moves from point P6 to P5, the frequency determining unit 44 determines that the carrier frequency fc is equal to F1, referring to the map 50 for non-locked state. On the other hand, during a period in which the operating point of the motor 100 moves from point P5 to point P4, the frequency determining unit 44 determines that the carrier frequency fc is equal to F3, referring to the map 52 for locked state.

Next, the case where the operating point of the motor 100 moves from point P3 to point P4, at an acceleration of which the absolute value |Am| is larger than the threshold value Adef, and then moves from point P4 to point P5, at an acceleration of which the absolute value |Am| is equal to or smaller than the threshold value Adef. In this case, during a period of movement from point P3 to point P4, the frequency determining unit 44 determines that the carrier frequency fc is equal to F1, referring to the map 50 for non-locked state. Also, during a period of movement from point P4 to point P5, the frequency determining unit 44 determines the carrier frequency fc, referring to the map 52 for locked state. In this case, the carrier frequency fc is equal to F1, since the current frequency is maintained, until the operating point moves from point P4 and comes out of the hysteresis region. On the other hand, the carrier frequency fc is equal to F3, during a period in which the operating point comes out of the hysteresis region and moves to point P5.

As is apparent from the above description, in this embodiment, when the motor 100 is in an accelerating or decelerating state, the non-protection frequency F1 or F2 is set as the carrier frequency fc, even if the motor operating point lies in the lock region. As a result, unnecessary noise can be prevented from being generated. Also, in this embodiment, whether the protecting frequency F3 needs to be set is determined, based on the motor acceleration Am (or the vehicle acceleration). Therefore, there is no need to add a new component, such as a temperature sensor, and the number of components can be prevented from being increased.

The configuration as described above is merely an example. Provided that the carrier frequency fc is set to a higher frequency in the case where the motor 100 is in an accelerating or decelerating state, than that in the case where the motor 100 is not in an accelerating or decelerating state, even when the operating point is in the lock region, the other configuration may be changed as appropriate. For example, while a single threshold value Adef is used when determining whether the motor 100 is in an accelerating or decelerating state, the threshold value may be given certain hysteresis. More specifically, two threshold values Adef1, Adef2 (Adef2>Adef1) may be provided for determination of the accelerating or decelerating state, and the map 52 for locked state may be referred to when the motor acceleration Am is equal to or smaller than Adef1, while the map 50 for non-locked state may be referred to when the motor acceleration Am exceeds Adef2. Also, the map that is currently referred to may continue to be referred to, when the motor acceleration Am is larger than Adef1, and is equal to or smaller than Adef2. With this arrangement, the frequency of switching of the reference maps can be reduced, and the carrier frequency fc is less likely to be changed.

Figure 6:
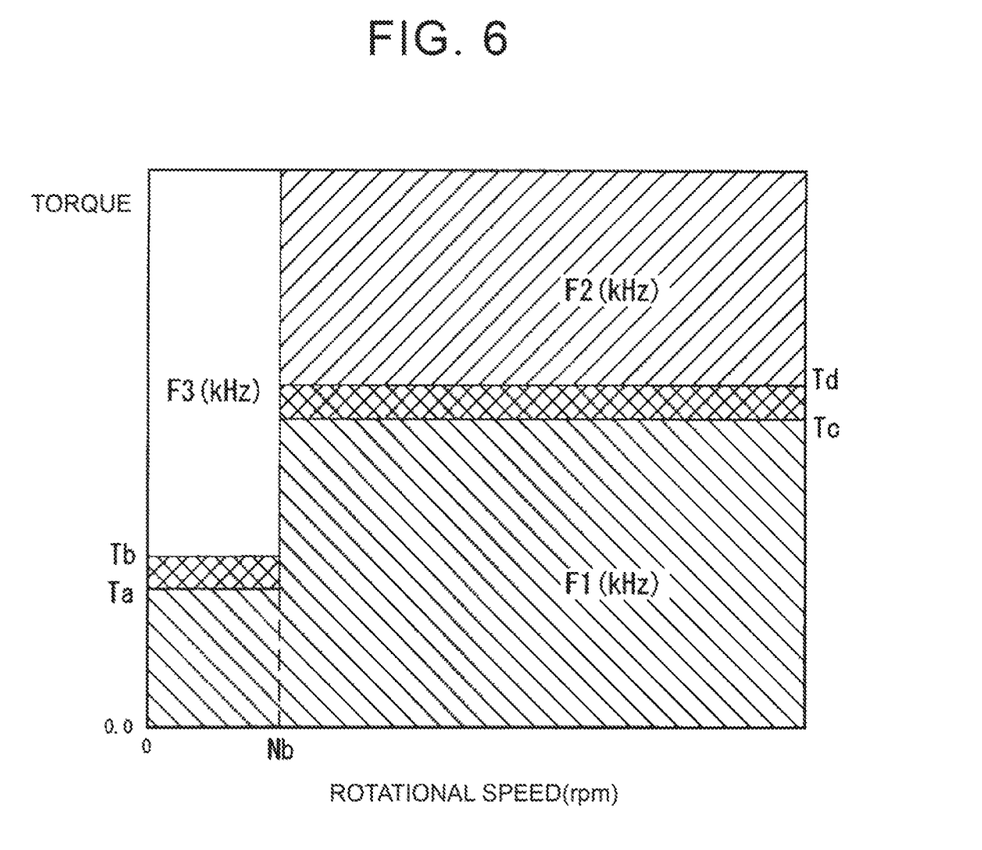
FIG. 6 is a view showing another example of a map for locked state.

In the example of FIG. 4, the hysteresis region is provided around the lock region, in the map 52 for locked state. However, when the threshold value Adef as a criterion for determination of the accelerating or decelerating state is set to a sufficiently small value, the hysteresis region may be eliminated in the map 52 for locked state, as shown in FIG. 6. Namely, when the threshold value Adef is set to a sufficiently small value, the motor 100 is determined as being in a non-locked state if the rotational speed changes just a little, and the map 50 for non-locked state is referred to. In this case, there is no need to provide a hysteresis region around the lock region, and the hysteresis region may be eliminated. Also, in this embodiment, the operating range of the motor 100 is divided into two regions in the map for non-locked state, and two non-protection frequencies F1, F2 are set for the two regions. However, the operating range of the motor 100 may be divided into a larger number of regions, or may be only a single region, in the map for non-locked state.

While two kinds of maps 50, 52 are selectively used in this embodiment, maps may not be used, provided that a higher carrier frequency fc is selected in the case where the motor 100 is in an accelerating or decelerating state, than that in the case where the motor 100 is not in an accelerating or decelerating state, even when the motor operating point is in the lock region.

What is claimed is:
1. A motor drive system comprising:
 a motor for driving a vehicle;
 an inverter including a plurality of switching devices and configured to convert direct-current power into alternating-current power; and an electronic control unit configured to generate a switching signal of each of the switching devices, by performing, based on a carrier wave, pulse-width modulation of a modulating wave indicating a command value for the motor, the electronic control unit being configured to change a carrier frequency as a frequency of the carrier wave, according to operating conditions of the motor, the electronic control unit being configured to set the carrier frequency to a protection frequency for protecting the switching devices, when the motor is in a first state in which an operating point determined by a rotational speed of the motor and torque of the motor lies in a lock region that is defined in advance, and the motor is not in an accelerating or decelerating state, and the electronic control unit being configured to set the carrier frequency to a non-protection frequency that is higher than the protection frequency, when the motor is in a second state in which the operating point lies in the lock region, and the motor is in the accelerating or decelerating state.

2. A method of controlling a motor drive system, the motor drive system including a motor for driving a vehicle, an inverter, and an electronic control unit, the inverter including a plurality of switching devices and configured to convert direct-current power into alternating-current power, the method comprising:

generating, by the electronic control unit, a switching signal of each of the switching devices, by performing, based on a carrier wave, pulse-width modulation of a modulating wave indicating a command value for the motor; changing, by the electronic control unit, a carrier frequency as a frequency of the carrier wave according to operating conditions of the motor;

setting, by the electronic control unit, the carrier frequency to a protection frequency for protecting the switching devices when the motor is in a first state in which an operating point determined by a rotational speed of the motor and torque of the motor lies in a lock region that is defined in advance, and the motor is not in an accelerating or decelerating state; and setting, by the electronic control unit, the carrier frequency to a non-protection frequency that is higher than the protection frequency when the motor is in a second state in which the operating point lies in the lock region, and the motor is in the accelerating or decelerating state.

3. The motor drive system according to claim 1, wherein the electronic control unit is configured to determine that the motor is in the accelerating or decelerating state, when an absolute value of the acceleration of the motor is larger than a threshold value that is larger than zero.

* * * * *